(12) United States Patent
Rapp et al.

(10) Patent No.: US 11,794,697 B2
(45) Date of Patent: Oct. 24, 2023

(54) WIPER BLADE, IN PARTICULAR FOR A MOTOR VEHICLE

(71) Applicant: Robert Bosch GmbH, Stuttgart (DE)

(72) Inventors: Harald Rapp, Buehl (DE); Sascha Geissler, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/771,201

(22) PCT Filed: Sep. 24, 2020

(86) PCT No.: PCT/EP2020/076721
§ 371 (c)(1),
(2) Date: Apr. 22, 2022

(87) PCT Pub. No.: WO2021/078466
PCT Pub. Date: Apr. 29, 2021

(65) Prior Publication Data
US 2022/0371554 A1    Nov. 24, 2022

(30) Foreign Application Priority Data
Oct. 25, 2019 (DE) ................ 10 2019 216 430.7

(51) Int. Cl.
*B60S 1/38* (2006.01)
*B60S 1/52* (2006.01)
*B60S 1/48* (2006.01)

(52) U.S. Cl.
CPC .......... *B60S 1/3805* (2013.01); *B60S 1/3862* (2013.01); *B60S 1/3886* (2013.01); *B60S 1/524* (2013.01); *B60S 1/487* (2013.01)

(58) Field of Classification Search
CPC ...... B60S 1/3805; B60S 1/3803; B60S 1/524; B60S 1/487
See application file for complete search history.

(56) References Cited

U.S. PATENT DOCUMENTS

| | | | |
|---|---|---|---|
| 3,428,993 A | | 2/1969 | Rickett |
| 3,574,881 A | * | 4/1971 | Temple ................ B60S 1/3805 |
| | | | 15/250.07 |
| 2014/0317973 A1 | | 10/2014 | Shen |

FOREIGN PATENT DOCUMENTS

| | | |
|---|---|---|
| DE | 1989712 U | 7/1968 |
| DE | 8006858 U1 | 10/1980 |
| DE | 19636796 A1 | 3/1998 |
| DE | 102005032698 A1 | 1/2007 |
| DE | 102008049270 A1 | 4/2010 |
| DE | 102008051397 A1 | 4/2010 |
| DE | 102011055948 A1 | 6/2013 |
| EP | 2808208 A1 | 12/2014 |
| EP | 2876005 A1 | 5/2015 |

(Continued)

OTHER PUBLICATIONS

WO2009130183A1 (machine translation) (Year: 2009).*

(Continued)

*Primary Examiner* — Andrew A Horton
(74) *Attorney, Agent, or Firm* — Michael Best & Friedrich LLP

(57) ABSTRACT

The invention relates to a wiper blade (10), in particular for a motor vehicle. Said wiper blade comprises a heating device with an elongated heating element (28). According to the invention, the heating element (28) comprises at least one loop (34).

9 Claims, 5 Drawing Sheets

(56) References Cited

FOREIGN PATENT DOCUMENTS

| WO | WO-2009130183 A1 * | 10/2009 | ............ B60S 1/3805 |
| WO | WO-2010034447 A1 * | 4/2010 | ............ B60S 1/3805 |

OTHER PUBLICATIONS

WO2010034447A1 (machine translation) (Year: 2010).*
Translation of International Search Report for Application No. PCT/EP2020/076721 dated Dec. 1, 2020 (2 pages).

* cited by examiner

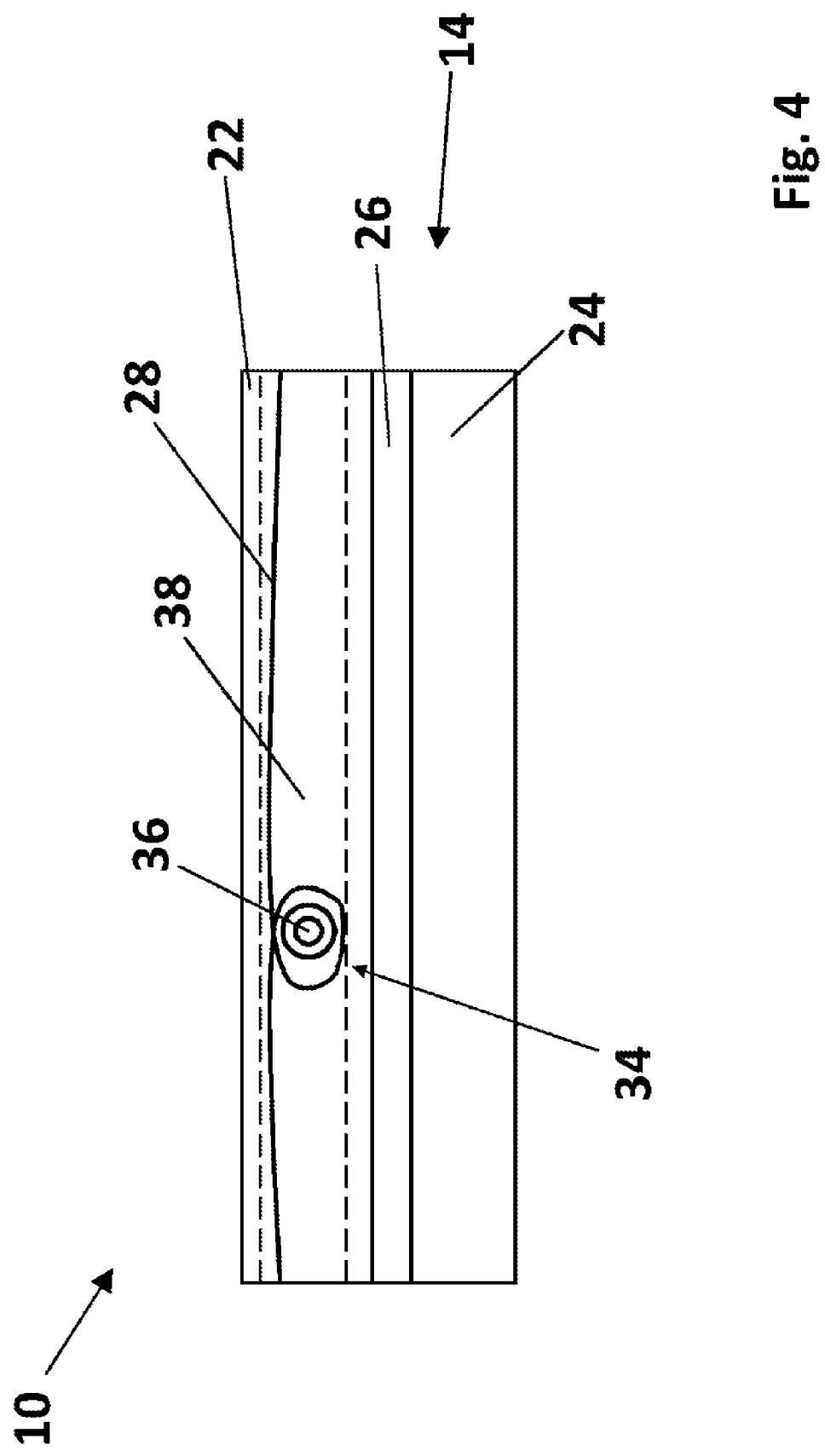

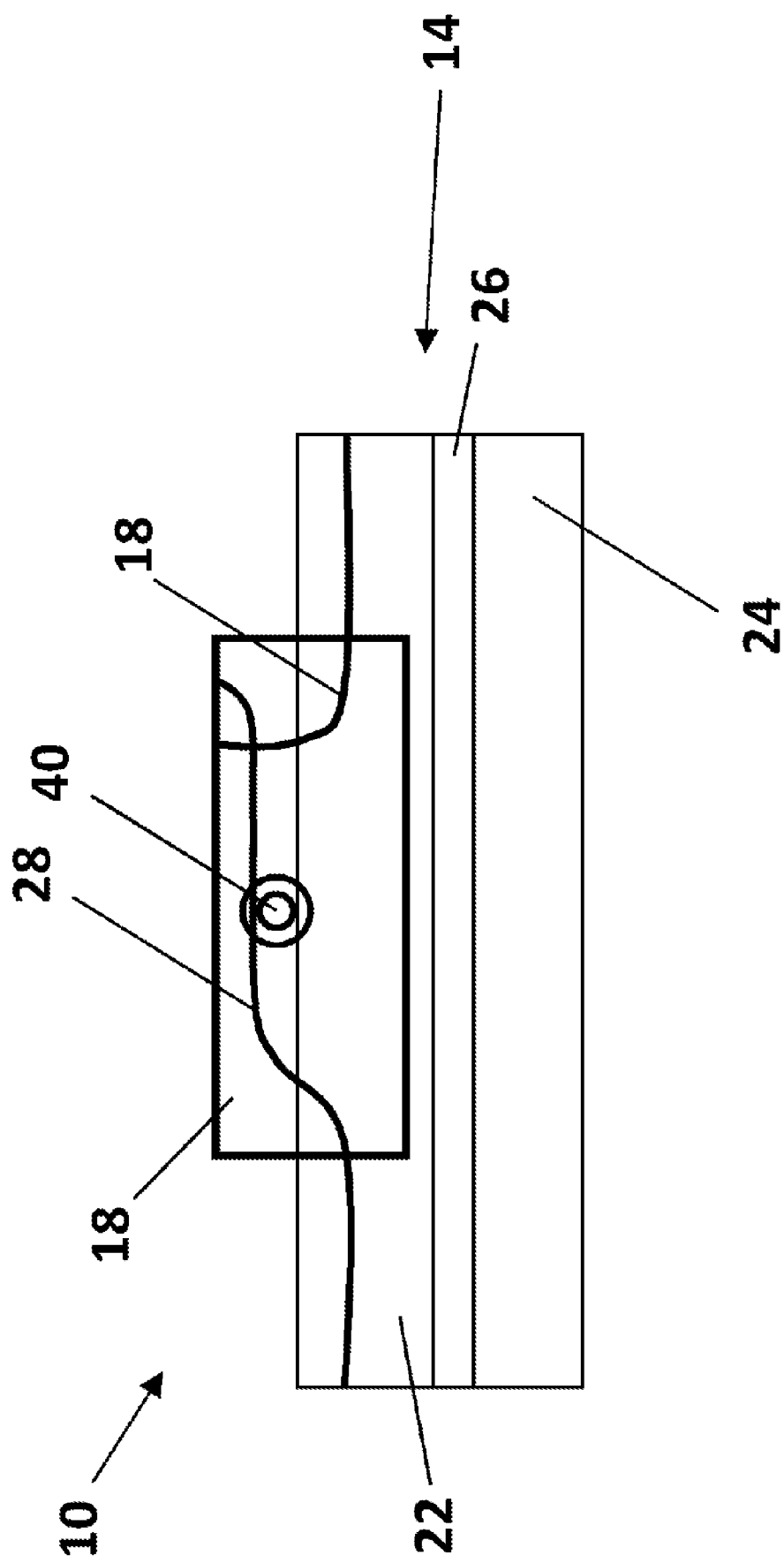

WIPER BLADE, IN PARTICULAR FOR A MOTOR VEHICLE

BACKGROUND OF THE INVENTION

The invention relates to a wiper blade, in particular for a motor vehicle.

Numerous wiper blades for motor vehicles that have a heating device with an elongate heating element are already known. For example, it is known from DE 10 2005 032 698 A1 to provide a heating wire which is arranged in an outer cavity of the window wiper rubber.

However, such a wiper blade is complicated to manufacture and is therefore costly.

SUMMARY OF THE INVENTION

The wiper blade according to the invention having the features of the main claim has the advantage that the heating element has at least one loop. This simplifies the manufacturing, and therefore a cost-effective wiper blade is produced.

The measures cited in the dependent claims give rise to advantageous developments and improvements of the features specified in the main claim.

In a simple and advantageous embodiment, an end cap is provided at one end of the longitudinal extent of the wiper blade, and the loop is arranged in the region of the end cap. As a result, the heating device can easily be pulled into the wiper blade and, furthermore, the heating of the wiper blade is improved, which has a positive effect on the wiping pattern.

Furthermore, it should be considered to be advantageous if a fastening means is provided for fastening to a wiper arm, and the heating element runs through the fastening means, in particular in a loop. By this means, the fastening means is heated, and therefore the wiping performance is improved further. In particular, if the fastenings to the wiper arm are movable, the movability is thereby maintained at low temperatures, as a result of which the wiping pattern is improved.

It is particularly advantageous if at least one liquid guide having at least one outlet opening is provided, and the loop is arranged in the region of the outlet opening. This gives rise to optimum heating of the outlet opening through which the cleaning fluid is applied to the window or enters the wiper blade.

It is of particular advantage in this connection if the loop at least partially loops around the outlet opening. The heating performance is thereby improved further.

In a simple, cost-effective and therefore advantageous embodiment, the heating element is advantageously configured as a heating wire.

The wiper strip is produced particularly simply and cost-effectively and therefore advantageously by extrusion, wherein the heating element is held in the wiper strip in a materially bonded manner. As a result, furthermore, there is good contact between the heating device and the wiper strip, which further improves the wiping performance.

A good heating performance is obtained in particular by the loop having a looping angle which is greater than 180 degrees.

BRIEF DESCRIPTION OF THE DRAWINGS

Various exemplary embodiments of the invention are illustrated in the drawings and explained in more detail in the description below. In the drawings:

FIG. 4 shows the region of the fastening means of a wiper blade according to the invention in a schematic illustration.

FIG. 5 shows a schematic side view of the wiper blade.

DETAILED DESCRIPTION

Figure 1:
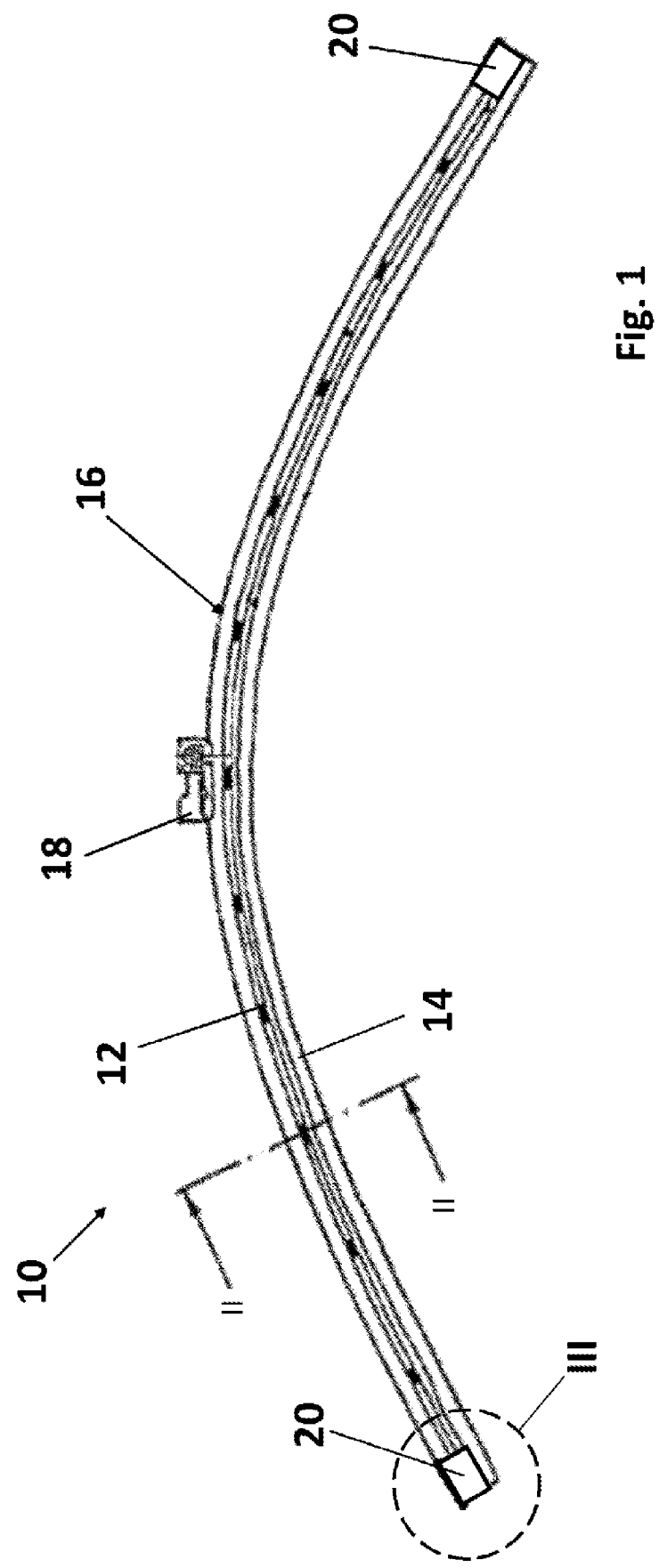
FIG. 1 shows a wiper blade according to the invention in a schematic side view.

FIG. 1 shows a side view of a wiper blade 10 according to the invention in a schematic illustration.

The wiper blade 10 comprises a spring rail 12 to which a wiper strip 14 is fastened. A wind deflecting strip 16 is arranged on that side of the spring rail 12 which faces away from the wiper strip 14. A fastening means 18 is arranged approximately centrally with respect to the longitudinal extent of the wiper blade 10, the fastening means serving for fastening the wiper blade 10 to a wiper arm, not shown for reasons of clarity.

Furthermore, an end cap 20 which closes off the wiper blade 10 with regard to its longitudinal extent is arranged at both ends of the longitudinal extent of the wiper blade 10.

Figure 2:
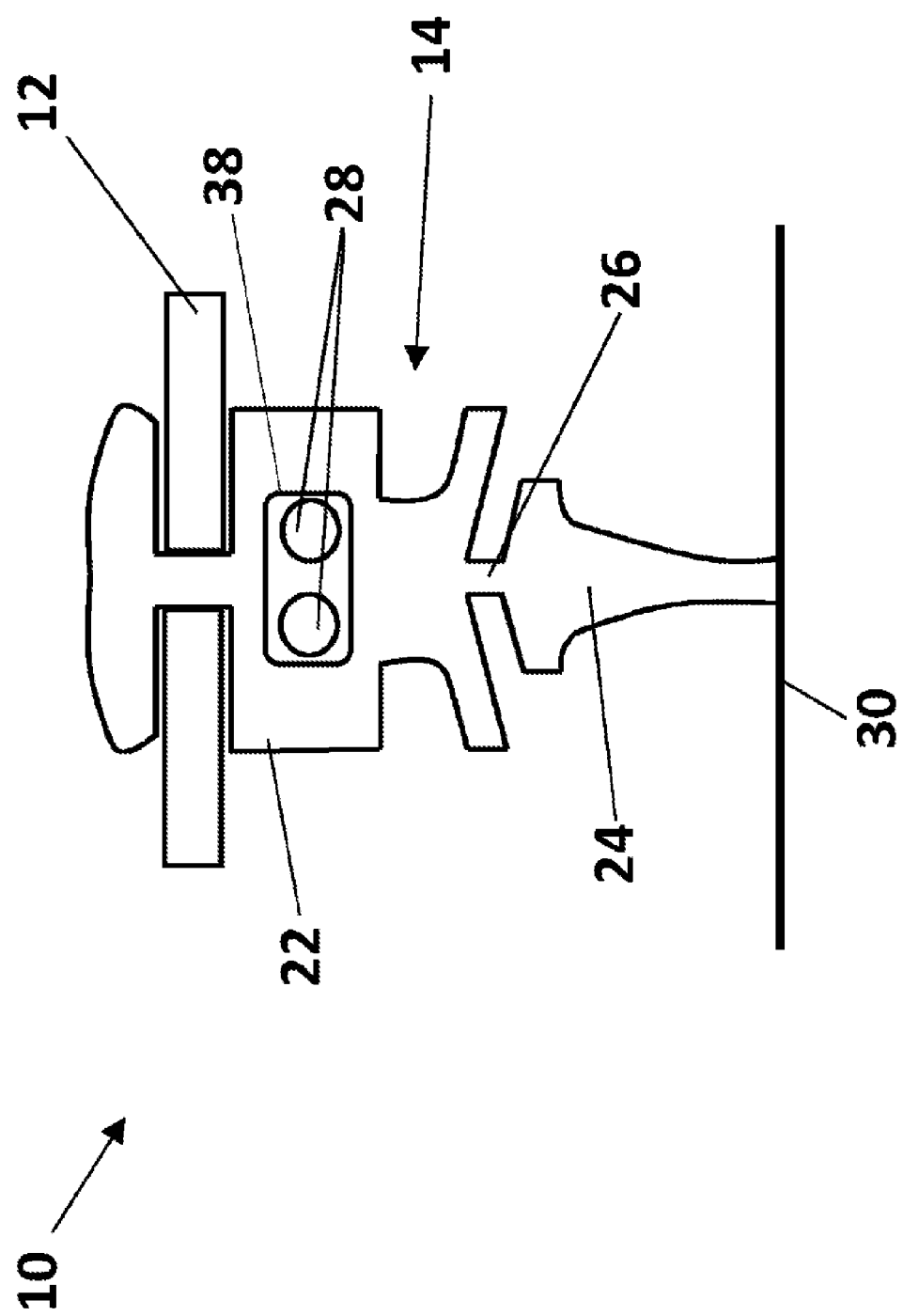
FIG. 2 shows a cross section through a wiper blade according to the invention in a schematic illustration.

FIG. 2 shows a cross section through a wiper blade 10 according to the invention. The wiper strip 14 has two sections, specifically a first fastening section 22 with which the wiper blade 14 is fastened to the spring rail 12. A wiper lip 24 which is fastened to the fastening section 22 via a tilting web 26 is arranged on the side facing away from the spring rail 12. Arranged inside the fastening section 22 is a heating element 28 as heating device which essentially consists of a heating wire. The heating element 28 is therefore configured to be elongate and flexible.

In the mounted position on the motor vehicle, the wiper lip 24 rests on a window 30 of the motor vehicle.

Figure 3:
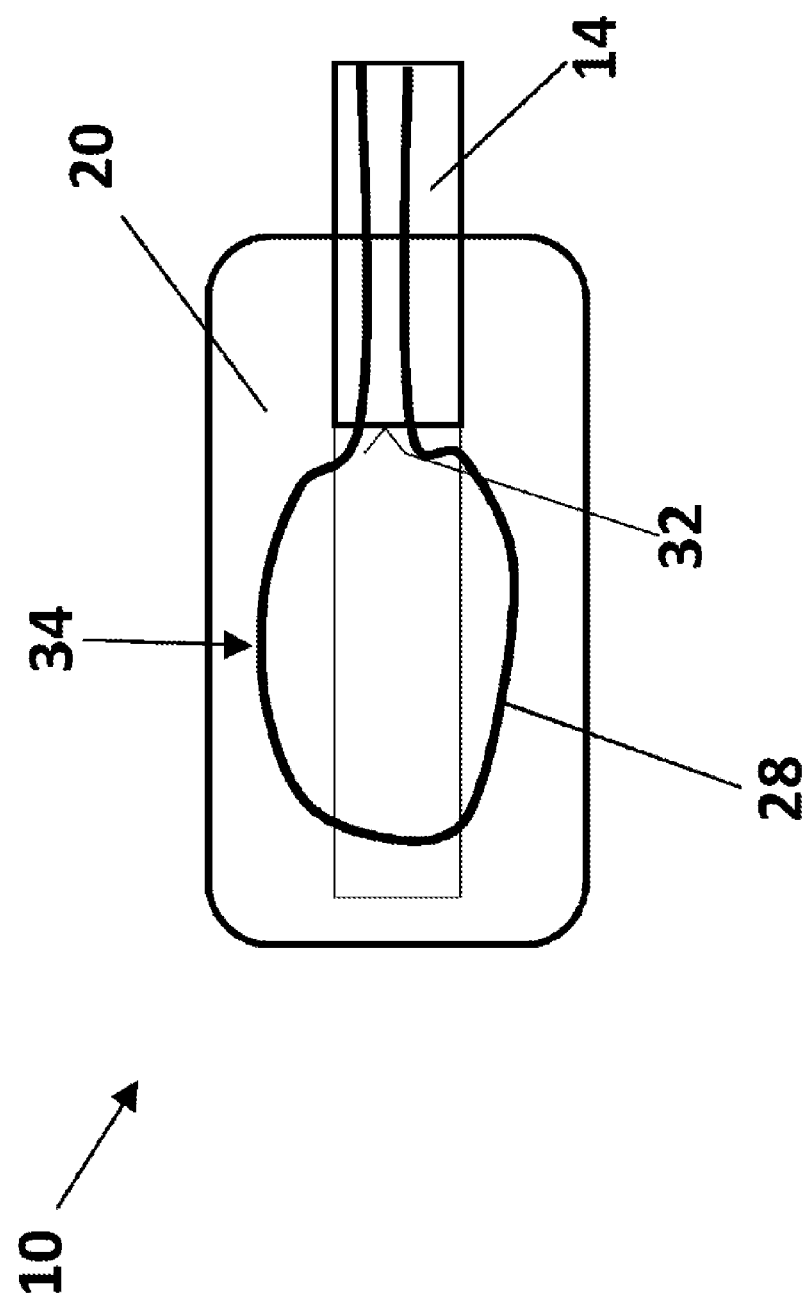
FIG. 3 shows the end region of a wiper blade according to the invention with an end cap in a schematic illustration.

FIG. 3 shows the end of the longitudinal extent of a wiper blade 10 according to the invention with the end cap 20. At the end of the longitudinal extent of the wiper strip 14, the heating element 28 emerges on an end side 32 of the wiper strip 14 and is guided in a loop 34, or is configured as a loop 34. The loop 34 is configured here as an O-shaped loop, and therefore the heating element 28, which is configured as a heating wire, emerges, figuratively speaking, from the end sides 32 of the wiper strip 14, completes an approximately O- or ring-shaped loop in the end cap 20 and enters again into the end side 32 of the wiper strip 14. During the manufacturing, the heating wire is bent by 180 degrees, such that a U-shaped loop is produced, which corresponds to a looping angle of 180 degrees. This U-shaped loop then produces a double wire which is pulled through the wiper strip 14. The loop 34 is thereby arranged at one end of the longitudinal extent of the wiper strip 14. Subsequently, the U-shaped bending point can also be bent open, thus producing an O shape or an approximately annular loop, which then corresponds to a looping angle of 360 degrees.

In a variation of the invention, the heating element 28 can also have a plurality of loops 34 at this point, and therefore the heating performance in the region of the end cap 20 is increased even further.

FIG. 4 shows a side view of a section of a wiper blade 10 according to the invention. A liquid guide 38, within which the heating element 28 runs, is provided in the fastening section 22 of the wiper strip 14. The fastening section 22 is connected to the wiper lip 24 via the tilting web 26.

The liquid guide 38 is configured as a hollow channel and has an outlet opening 36 which is configured as an outlet nozzle, and therefore the cleaning fluid can be dispensed from the liquid guide 38 via the outlet opening 36 in the direction of the wiper lip 24. The heating element 28 which is configured as a heating wire is guided here in the liquid guide 38 and loops around the outlet opening 36 in the form of a loop 34. As a result, the heating performance of the heating element 38 is increased in the region of the outlet opening 36.

In a variation of the invention, as also in the region of the end cap 20 (FIG. 3), the loop 34 can also have a plurality of revolutions in order to increase the heating performance in this region even further.

FIG. 5 shows a schematic side view of the wiper blade 10 according to the invention in the central region with the fastening element 18. As in the previous drawings, the heating device 28 runs in the region of the fastening section 22 and runs through the fastening element 18 in order also to heat the latter. A loop 34, which is not shown here for reasons of clarity, can also run here, in order to increase the heating performance. The fastening element 18 is typically configured as a plastics injection molded part, but may also be configured as a metal part. It is held on the spring rail 12, not shown here for reasons of clarity, and on the fastening section 22. Since the fastening element 18 is intended to be fastened rotatably to the wiper arm, the fastening element 18 has a hinge element 40 which can be configured as a bore for a pin, which is arranged on the wiper arm, or for a bolt. Since freezing of the hinge element is undesirable, the heating element 28 is guided close to the hinge element 40. Furthermore, the heating element 28 can also form a loop 34 around the hinge element 40 in order to increase the heating performance at this critical point.

In a variation of the invention, the heating device 18 can also be guided in the wiper lip 24 instead of the fastening section 22. Furthermore, the liquid guide 38 can also be arranged outside the fastening section 22 such that the heating device 28 together with the loop 34 is then not provided in the fastening section 22, but rather in the liquid guide 38, and therefore the loop 34, owing to the arrangement of the outlet openings 36, is also provided in the liquid guide 38.

During the manufacturing of a wiper blade according to the invention, first of all the wiper strip 14 is therefore produced by extrusion and is then fastened to the spring rail 12. In this blank produced in this way, the heating device 18 is then simply pulled in and guided in loops through the corresponding points, such as outlet opening 36, end cap 20 or/and fastening element 28.

What is claimed is:

1. A wiper blade (10) extending along a longitudinal direction and comprising a heating device with an elongate heating element (28), characterized in that the heating element (28) comprises a loop (34), wherein the wiper blade includes at least one liquid guide (38) having at least one outlet opening (36), and the loop (34) is arranged in the region of the outlet opening (36), such that the loop (34) entirely loops around the outlet opening (36) as viewed along a direction perpendicular to the longitudinal direction.

2. The wiper blade (10) as claimed in claim 1, wherein the loop (34) is a first loop (34), wherein the heating element (28) includes a second loop (34), wherein the wiper blade (10) includes an end cap (20) provided at a longitudinal end of the wiper blade, and and wherein the second loop is arranged in the region of the end cap (20).

3. The wiper blade (10) as claimed in claim 1, characterized in that a fastening means (18) is provided for fastening to a wiper arm, and the heating element (28) runs through the fastening means (18).

4. The wiper blade (10) as claimed in claim 3, wherein the loop (34) is a first loop, and wherein the heating element (28) runs through the fastening means (18) in a second loop.

5. The wiper blade (10) as claimed in claim 1, characterized in that the heating element (28) is configured as a heating wire.

6. The wiper blade (10) as claimed in claim 1, characterized in that an extruded wiper strip (14) is provided and the heating element (28) is held in a materially bonded manner in the wiper strip (14).

7. The wiper blade (10) as claimed in claim 6, wherein the heating element (28) is extruded within the wiper strip (14).

8. The wiper blade (10) as claimed in claim 1, characterized in that the loop (34) has a looping angle which is greater than 180 degrees.

9. The wiper blade (10) as claimed in claim 1, wherein the wiper blade (10) is for a motor vehicle.

* * * * *